United States Patent
Wiedeman et al.

(10) Patent No.: US 6,775,251 B1
(45) Date of Patent: Aug. 10, 2004

(54) SATELLITE COMMUNICATION SYSTEM PROVIDING MULTI-GATEWAY DIVERSITY AND IMPROVED SATELLITE LOADING

(75) Inventors: Robert A Wiedeman, Los Altos, CA (US); Paul A Monte, San Jose, CA (US)

(73) Assignee: Globalstar L.P., San Jose, CA (US)

( * ) Notice: Subject to any disclaimer, the term of this patent is extended or adjusted under 35 U.S.C. 154(b) by 0 days.

(21) Appl. No.: 09/156,290

(22) Filed: Sep. 17, 1998

(51) Int. Cl.$^7$ ................................................ H04B 7/185
(52) U.S. Cl. ..................... 370/316; 370/401; 455/12.1; 455/13.1; 455/427; 455/453
(58) Field of Search ..................... 370/311, 315–326, 370/332, 331, 327, 401; 455/3.02, 12.1, 13.1, 13.2–13.3, 13.4, 427–430, 98, 453

(56) References Cited

U.S. PATENT DOCUMENTS

| | | | |
|---|---|---|---|
| 4,983,980 A | * | 1/1991 | Ando |
| 5,592,481 A | | 1/1997 | Wiedeman et al. ......... 370/316 |
| 5,949,766 A | * | 9/1999 | Ibanez-Meier et al. |
| 5,999,797 A | * | 12/1999 | Zancho et al. |
| 6,091,933 A | * | 7/2000 | Sherman et al. |
| 6,226,493 B1 | * | 5/2001 | Leopold et al. |

FOREIGN PATENT DOCUMENTS

| | | | |
|---|---|---|---|
| EP | 0536033 A2 | 9/1992 | ........... H04B/7/195 |
| EP | 0682416 A2 | 11/1995 | ........... H04B/7/005 |
| EP | 0748062 A2 | 12/1996 | ........... H04B/7/185 |
| EP | 0837568 A2 | 4/1998 | ........... H04B/7/185 |

* cited by examiner

Primary Examiner—Dang Ton
Assistant Examiner—Inder Pal Mehra
(74) Attorney, Agent, or Firm—Karambelas & Associates (57) ABSTRACT

A method includes steps of (a) establishing a call connection between a terrestrial telecommunications network and a user terminal via a first gateway and at least one satellite, (b) while the call connection is established, selecting at least one further satellite, and (c) maintaining the call connection to the terrestrial telecommunications network via a second gateway, the least one further satellite, and the first gateway. The at least one further satellite is selected, at least in part, based on information transmitted from the second gateway to the first gateway through an inter-gateway communications link, and can be based on signal quality indications determined at the user terminal, signal quality indications determined at the gateway(s), or path gains calculated at the gateway(s).

20 Claims, 10 Drawing Sheets

SATELLITE COMMUNICATION SYSTEM PROVIDING MULTI-GATEWAY DIVERSITY AND IMPROVED SATELLITE LOADING

CROSS-REFERENCE TO RELATED APPLICATIONS

This patent application is related to U.S. patent application Ser. No. 08/778,882, filed Jan. 3, 1997, entitled "Multiple Satellite Repeater Capacity Loading with Multiple Spread Spectrum Gateway Antennas", by Robert A. Wiedeman et al., now U.S. Pat. No. 5,812,538, issued on Sep. 22, 1998, which is a continuation of U.S. patent application Ser. No. 08/465,972, filed Jun. 6, 1995, now U.S. Pat. No. 5,592,481, issued on Jan. 7, 1997, the disclosures of which are incorporated by reference herein in their entireties.

FIELD OF THE INVENTION

This invention relates generally to satellite-based communications systems and, in particular, to satellite communications systems that employ a constellation of non-geosynchronous orbit (NGSO) satellites, a plurality of user terminals, and a plurality of gateways for interconnecting voice or data calls between individual ones of the user terminals and terrestrial communication networks via one or more satellites of the NGSO constellation.

BACKGROUND OF THE INVENTION

The above-referenced U.S. Pat. No. 5,592,481 describes a satellite communication system that employs terrestrial gateways and a constellation of NGSO satellites, such as Low Earth Orbit (LEO) satellites, for linking user terminals to, for example, the Public Switched Telephone Network (PSTN). Each gateway has a gateway coverage area and services those user terminals that reside permanently or temporarily within the coverage area. A call that arrives at the gateway from the PSTN for a given user terminal is connected to the user terminal via one or more satellites. In like manner a call originated by the user terminal is connected to the PSTN through the gateway and one or more satellites. This system employs a Code Division Multiple Access (CDMA) modulation scheme and enables the gateway to set up multiple links to and from the user terminal through two or more satellites using two or more directional gateway antennas. This provides satellite diversity, as the user terminal (and gateway) are enabled to coherently combine two or more received signals, thus mitigating the effects of signal blockage and fading.

Figure 1:
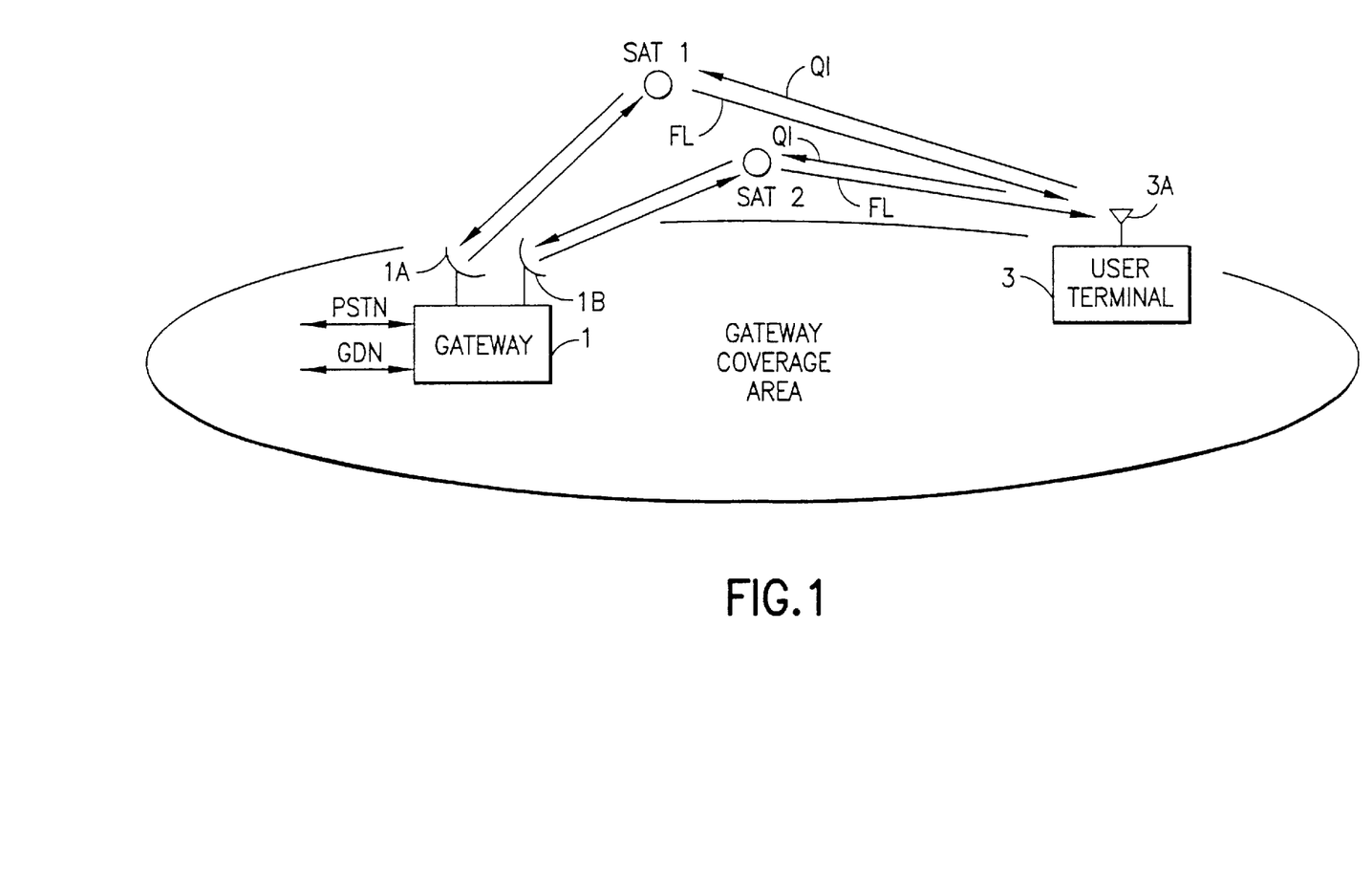
FIG. 1 is diagram that is useful in explaining the teachings of the above-referenced U.S. Pat. No. 5,592,481, as well as the teachings of the above-referenced, U.S. patent applications Ser. No. 08/903,166, filed Jul. 3, 1997 now U.S. Pat. No. 5,796,760 dated Aug. 18, 1998, and Ser. No. 08/239,750, filed May 9, 1994 now U.S. Pat. No. 5,859,874 dated Jan. 12, 1999.

Referring to FIG. 1 of this patent application, the above-referenced U.S. Patent generally teaches a satellite communications system wherein a gateway (GW) 1 bidirectionally communicates with a user terminal (UT) 3 via NGSO satellites (e.g., at least SAT 1 and SAT 2). SAT 1 and SAT 2 may be bent pipe repeaters, or may use on-board processing and may contain regenerative repeaters. The gateway 1 is bidirectionally coupled to a terrestrial communications system, such as the Public Switched Telephone Network (PSTN), as well as to a Ground Data Network (GDN) which provides an ability to communicate with a Ground Operations Control Center (GOCC), which is not shown. The gateway 1 includes a plurality of directional antennas, e.g., antennas 1A and 1B, while the user terminal 3 includes, typically, an omni-directional antenna 3A. For the case of a voice or data call that is connected to the PSTN the gateway 1 can provide multiple satellite diversity by routing Code Division Multiple Access (CDMA) forward links through at least SAT 1 and SAT 2.

As is also disclosed in copending U.S. patent application Ser. No. 08/903,166, filed Jul. 3, 1997 now U.S. Pat. No. 5,796,760 dated Aug. 18, 1998, entitled "Multipath Communication System Optimizer", by Robert A. Wiedeman and Paul A. Monte, which is a continuation of U.S. patent application Ser. No. 08/239,750, filed May 9, 1994 now U.S. Pat. No. 5,859,874 dated Jan. 12, 1999, the disclosures of which are incorporated by reference herein in their entireties, each forward link (FL) has a unique spreading code that enables the link to be separately despread, demodulated and combined in the user terminal 3. This provides multiple satellite diversity for the user terminal 3, and facilitates overcoming signal blockage and fading conditions that may occur between the user terminal 3 and one or more of the satellites. The user terminal 3 may thus include a multi-finger decorrelator such as a Rake receiver. Two or more fingers can be used for receiving forward traffic channels from two or more of the satellites, while another finger can be time multiplexed to receive pilot signals transmitted by the gateway 1 through the different satellites. If available, a plurality of fingers can be used for this purpose.

In the system disclosed in U.S. Pat. No. 5,592,481 a technique is provided for allocating communications traffic through the plurality of satellites of the NGSO constellation. Each of the plurality of satellites is oriented, at any given time when in view of the user terminal, at a particular elevation angle. A method includes steps of: (a) providing each of the plurality of satellites with a receiver for receiving communication links from the ground station and a transmitter for transmitting communication links to user terminals; (b) in response to a request for service, determining if a highest elevation angle satellite can be assigned a new communications link; (c) if yes, assigning a new communication link to the highest elevation angle satellite; (d) if no, determining if a second highest elevation angle satellite can be assigned a new communications link; and (e) if yes, assigning a new communication link to the second highest elevation angle satellite. A number of different criteria can be employed in determining if a satellite can be assigned a new communication link, including: determining if the associated satellite has already been assigned a predetermined maximum number of communication links; and determining if the associated satellite, or a particular beam, is transmitting at or near to a power level that corresponds to a maximum peak flux density at the surface of the earth. Each of the steps of assigning is preferably accomplished such that the communication link is simultaneously established through at least two of the satellites to provide for diversity reception at a user terminal. This method is extended to a case of assigning a new satellite during the handoff of the user terminal to a another satellite, as well as to a case of assigning additional satellites to enhance the satellite diversity provided to the user terminal.

It would be desirable to extend these teachings so as to provide additional criteria that can be considered during the assignment of one or more satellites to the user terminal.

It would also be desirable to extend these teachings such that a user terminal would be enabled to transition from a first gateway coverage area to a second gateway coverage area during a call, without dropping the call or requiring that the call be somehow switched from the first gateway to the second gateway, as well as to optimally assign communication satellites to the user terminal. For example, it is envisioned that during a call some mobile user terminals, such as those contained within automobiles, trains and aircraft, will cross political and other boundaries that also happen to define boundaries between adjacent gateway coverage areas. Alternatively, and for the case of a user that is relatively stationary, the user may be better served by either of two gateways, depending on co-visible satellites.

OBJECTS AND ADVANTAGES OF THE INVENTION

It is a first object and advantage of this invention to provide a satellite communication system that enables a user terminal to simultaneously use and be assigned to satellites that are in view of the user terminal and at least two gateways, at the same time or not at the same time.

It is another object and advantage of this invention to extend the teachings of the above-referenced U.S. Pat. No. 5,592,481 to provide additional criteria upon which to base an assignment of a new communication satellite or satellites to a user terminal.

SUMMARY OF THE INVENTION

The foregoing and other problems are overcome and the objects are realized by methods and apparatus in accordance with embodiments of this invention.

In one aspect this invention provides a method for operating a satellite communications system, and a system that operates in accordance with the method.

The method includes steps of (a) establishing a call connection between a terrestrial telecommunications network and a user terminal via a first gateway and at least one satellite, (b) while the call connection is established, selecting at least one further satellite, and (c) maintaining the call connection to the terrestrial telecommunications network via a second gateway, the least one further satellite, and the first gateway. The at least one further satellite is selected, at least in part, based on information transmitted from the second gateway to the first gateway through an inter-gateway communications link.

The at least one further satellite need not be a new satellite, but could be a satellite that is going out of visibility at the first gateway and that is visible at the second gateway, and that will remain visible at the second gateway for at least some period of time.

In one embodiment the step of selecting includes steps of generating signal quality indications in the user terminal; transmitting the signal quality indications back to the first gateway directly and via the second gateway; and selecting the at least one further satellite at the first gateway based at least in part on the signal quality indications.

In another embodiment the step of selecting includes steps of generating signal quality indications at the first gateway based on signals received from the user terminal at the first and second gateways; and selecting the at least one further satellite at the first gateway based at least in part on the signal quality indications.

In a further embodiment the step of selecting includes steps of generating signal quality indications at the first gateway based on signals received from the user terminal at the first gateway; generating signal quality indications at the second gateway based on signals received from the user terminal at the second gateway; transmitting the generated signal quality indications back to the first gateway from second gateway; and selecting the at least one further satellite at the first gateway based at least in part on the signal quality indications.

In another embodiment the step of selecting includes steps of calculating at least one of current or future path gains at the first gateway based on signals received from the user terminal at the first and second gateways; and selecting the at least one further satellite at the first gateway based at least in part on the calculated path gains.

In a further embodiment the step of selecting includes steps calculating at least one of current or future path gains at the first gateway based on signals received from the user terminal at the first gateway; calculating at least one of current or future path gains at the second gateway based on signals received from the user terminal at the second gateway; transmitting the calculated path gains back to the first gateway from second gateway; and selecting the at least one further satellite at the first gateway based at least in part on the calculated path gains.

In all of these embodiments the step of selecting may further consider at least one of satellite elevation angle relative to the user terminal, satellite loading, satellite power consumption, and satellite transmitted power flux density.

The foregoing multi-gateway embodiments are also applicable to a single gateway case, wherein the inter-gateway communication link, or some other link, is not used for conveying the information between the gateways.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

A constellation of communications satellites of most interest to this invention is a Non-Geosynchronous Orbit (NGSO) constellation. The NGSO constellation may be a Low Earth Orbit (LEO) or a Medium Earth Orbit (MEO) constellation, or may comprise various High altitude circular or Elliptical Orbits (HEO), or may use orbits such as Loopus, ACE, or Molnya orbits, or any other suitable orbits. The NGSO constellation may thus be in any set of orbit configurations, but generally will use inclined circular orbits or polar orbits. However, constellations of elliptical orbit satellites or combinations of elliptical and circular orbits can be used as well. The orbit of the NGSO constellation thus need not be inclined but may instead be equatorial, polar, or any other configuration, including sun synchronous. Thus, while in the ensuing description the NGSO constellation will be referred to as a LEO constellation using an inclined circular orbit of less than 2000 km, the teachings of this invention are not limited to the use of only this particular type of NGSO constellation.

Suitable, but not limiting, types of LEO satellite systems that can be used to implement the teachings of this invention, when modified as described below, are taught in U.S. Pat. No. 5,619,525, "Closed Loop Power Control for Low Earth Orbit Satellite Communication System", by R. A. Wiedeman and M. J. Sites; U.S. Pat. No. 5,448,623, "Satellite Telecommunications System Using Network Coordinating Gateways Operative with a Terrestrial Communication System", by R. A. Wiedeman and P. A. Monte; and U.S. Pat. No. 5,303,286, "Wireless Telephone/Satellite Roaming System", by R. A. Wiedeman, the teachings of which are incorporated by reference herein in their entireties.

The teaching of this invention extends the teachings of the above-referenced U.S. Pat. No. 5,592,481, as well as the teachings of the above-referenced U.S. patent applications Ser. No. 08/903,166, filed Jul. 3, 1997, now U.S. Pat. No. 5,796,760 dated Aug. 18, 1998 and Ser. No. 08/239,750, filed May 9, 1994 now U.S. Pat. No. 5,859,874 dated Jan. 12, 1999, to provide multi-gateway diversity for the user terminal 3, as well as controlled links in the multiple satellite diversity case, and further provides additional satellite selection criteria and an ability to assign a user terminal to satellites that are in view of the user terminal and individual ones of a plurality of gateways.

Figure 6:
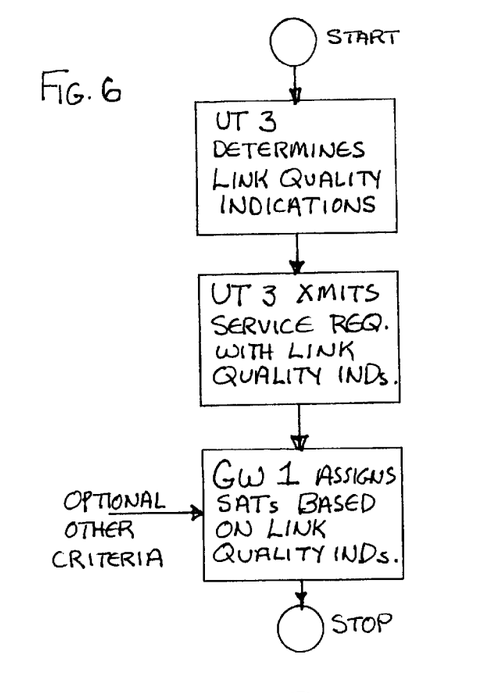
FIGS. 6, 7 and 8 are each a logic flow diagram of single gateway satellite allocation methods in accordance with this invention.

Referring to FIG. 6, in one embodiment of this invention the user terminal derives link quality information from the forward links made through a plurality of satellites, such as a pilot channel signal strength received through each satellite, and transmits link quality indications (QIs) back to the gateway 1 along with a service request, or any other suitable message. The link quality information could be based as well on, by example, energy per bit ($E_b$) divided by noise density ($n_o$), or on energy per bit divided by interference density ($I_o$), or on bit error rate and/or frame error rate. In response to the link quality indications received with the service request the gateway 1 assigns the user terminal to use one or more of the satellites. The assignment can be made based solely on the link quality indications criteria, or in combination with one or more other criteria, such as satellite elevation angle relative to the user terminal, satellite loading, satellite power consumption, satellite transmitted power flux density, etc.

Figure 7:
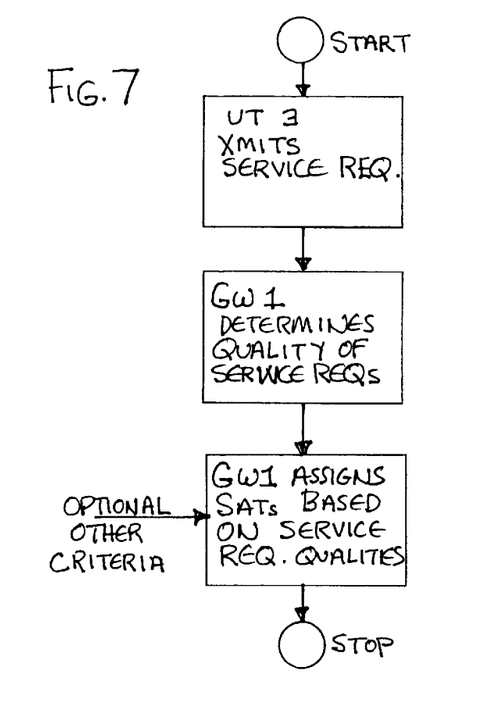

Referring to FIG. 7, in another embodiment of this invention the user terminal transmits a service request, or any other suitable message, back to the gateway 1 through a plurality of the satellites in view of the user terminal. In response to receiving the service request the gateway 1 measures the quality of the received service request, such as received signal power, and/or bit error rate, and/or frame error rate (etc.), at each of the gateway antennas 1A, 1B. The gateway 1 then assigns the user terminal to use one or more of the satellites based on the determined quality of the received service request. The assignment can be made based solely on the determined quality of the service request criteria or, as in the previous embodiment, in combination with one or more other criteria, such as satellite elevation angle relative to the user terminal, satellite loading, satellite power consumption, satellite transmitted power flux density, etc.

Figure 8:
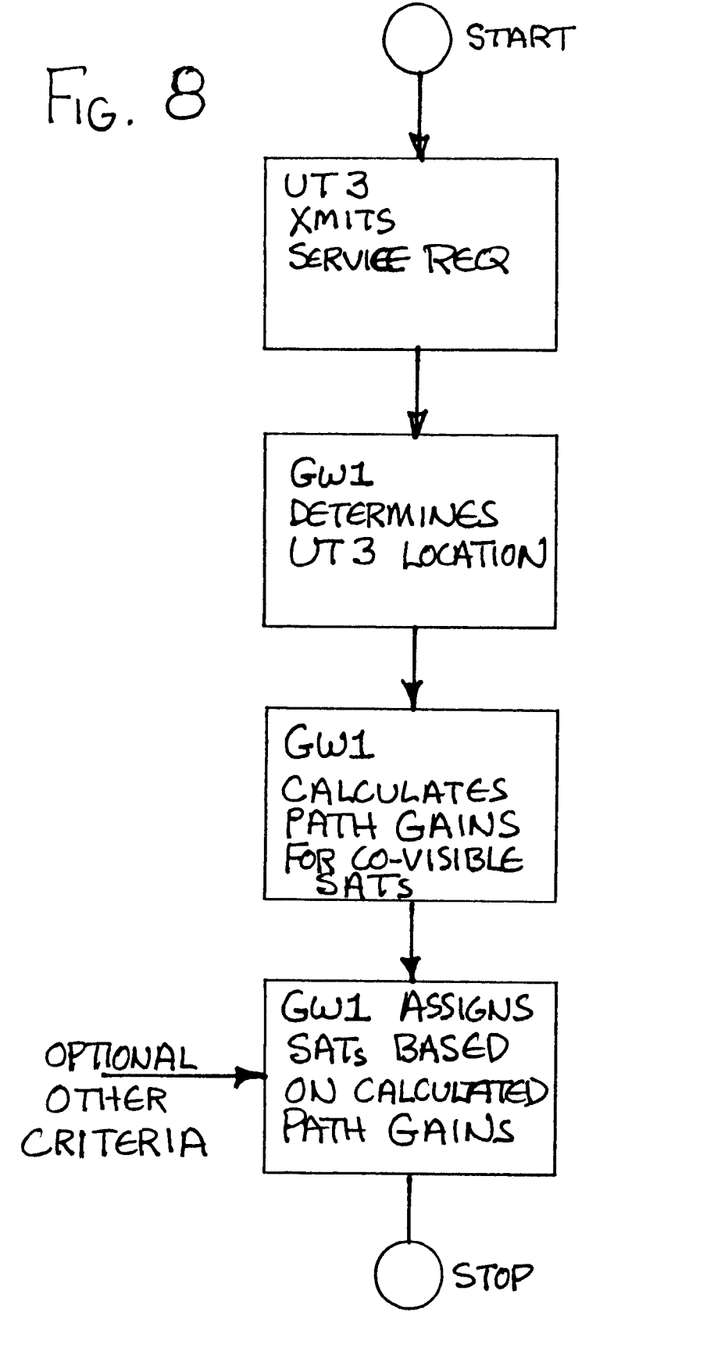

Referring to FIG. 8, in a further embodiment of this invention the user terminal transmits a service request, or any other suitable message, back to the gateway 1 through a plurality of the satellites in view of the user terminal. In response to receiving the service request the gateway 1 performs a position location on the user terminal 3 (if not done previously) and then calculates, based on stored satellite ephemerides data, date, time of day, and the user terminal and gateway locations, the path gain of the user terminal 3 through each of the satellites that relay the service request back to the gateway 1. The path gain can be determined in several ways.

A first technique simply considers the satellite transmitter gain plus the square of the path length (e.g., SAT TX gain+$(-\text{path})^2$).

A second technique considers the satellite transmitter gain, plus the square of the path distance, plus the user terminal receiver gain (e.g., SAT TX gain+$(-\text{path})^2$+UT RX gain).

A third technique also considers the gateway transmitter gain, the satellite receiver gain, and satellite gain prior to the satellite transmitter (e.g., GW TX gain+$(-\text{path}_{GW \text{ to } SAT})^2$+ SAT RX gain+SAT gain+SAT TX gain+$(-\text{path}_{SAT \text{ to } UT})^2$+ UT RX gain).

In any event, the gateway 1 then assigns the user terminal to use one or more of the satellites based on the determined path gains, with the highest path gain satellite being selected first. The assignment can be made based solely on the determined path gains or, as in the previous embodiments, in combination with one or more other criteria, such as satellite elevation angle relative to the user terminal, satellite loading, satellite power consumption, satellite transmitted power flux density, etc. The satellite assignments based on path gain can also be made in a predictive manner, by considering not only the current path gain through each of the satellites (based on the known satellite and user terminal locations), but future path gains as well. For example, if a given satellite that has a current high path gain is traveling in a direction that causes the path length relative to the user terminal's location to be continually increasing, then it may be desirable to select another satellite that, while currently having a path gain less than that of the first satellite, is travelling in a direction that will cause the path distance to decrease relative to the user terminal, thereby resulting in a gradually increasing path gain over some future period of time (e.g., the next two to ten minutes).

The foregoing teachings concerning the operation of a single gateway 1 in selecting satellite(s) to service the user terminal 3 are now extended to a case where a plurality of gateways are coupled together to provide gateway diversity for the user terminal.

Figure 2A:
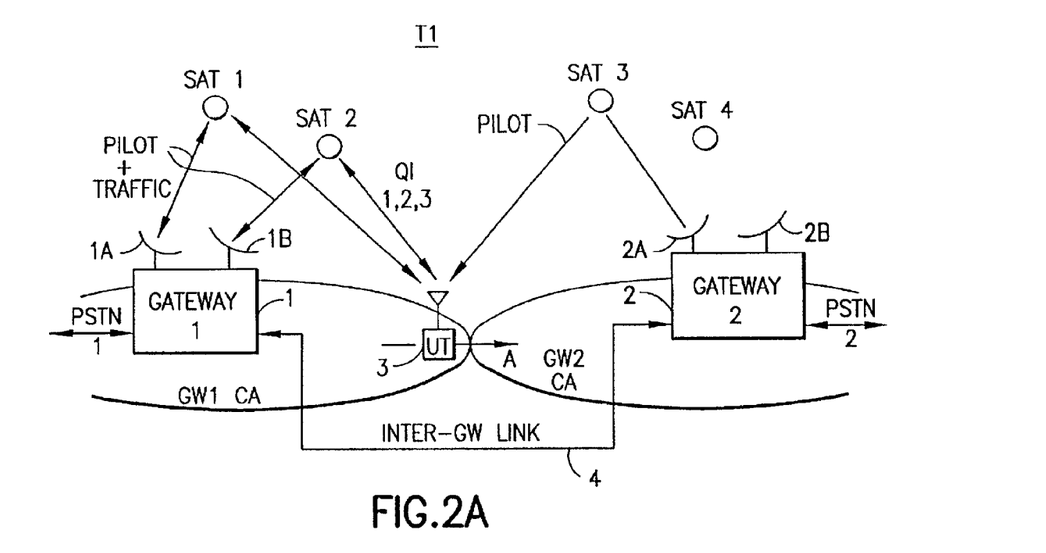
FIGS. 2A, 2B and 2C show the operation of the satellite communication system in accordance with the teaching of this invention at three instances in time as a user terminal transitions from the coverage area of a first gateway to the coverage area of a second gateway.
Figure 2B:
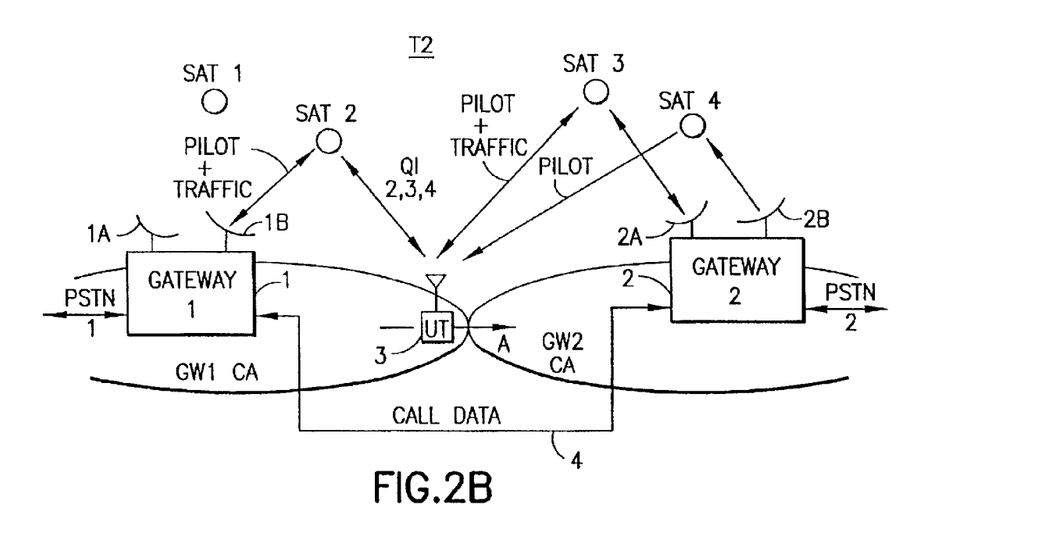
Figure 2C:
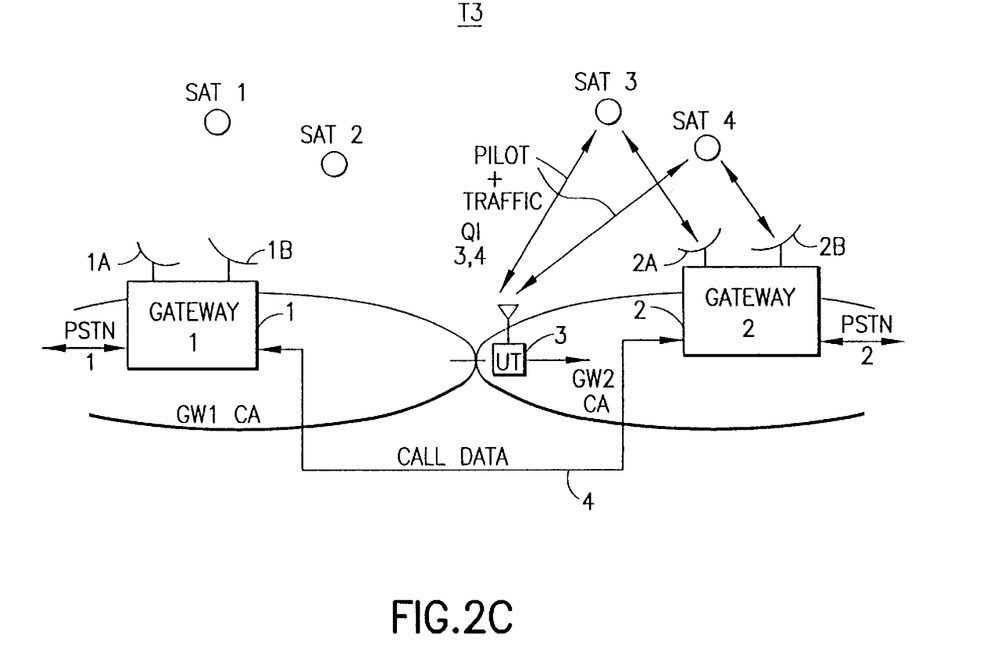

Referring first to FIGS. 2A–2C, there is shown the operation of the satellite communication system in accordance with the teaching of this invention at three instances in time as the user terminal 3 transitions from the coverage area (CA) of a first gateway (GW 1) to the coverage area of a second gateway (GW 2).

In FIG. 2A, at time T1, the UT 3 is assumed to be engaged in an active call (voice or data) and is moving in the direction indicated by the arrow (A). The call is connected from a first PSTN (PSTN-1), through the GW 1, and via forward and reverse links made through both SAT 1 and SAT 2. Each forward link contains a traffic channel and a pilot channel, each of which is identifiable by a unique spreading code. The UT 3 transmits a traffic channel on the reverse link which is received and relayed to GW 1 by both SAT 1 and SAT 2. The UT 3 also transmits link quality indications (QIs) for the received forward traffic links made through SAT 1 (QI-1) and through SAT 2 (QI-2). The GW 1 is responsive to the received QIs for selectively turning these links on or off, and/or adjusting the power of each of the forward traffic links, as described in the above-referenced U.S. patent applications Ser. No. 08/903,166, filed Jul. 3, 1997, now U.S. Pat. No. 5,796,760 dated Aug. 18, 1998 and Ser. No. 08/239,750, filed May 9, 1994 now U.S. Pat. No. 5,859,874 dated Jan. 12, 1999.

As the UT 3 approaches the coverage area of the second gateway (GW 2) it begins to receive a reference signal transmitted from GW 2 through SAT 3. Because of its location, SAT 3 may not be visible to GW 1. The UT 3 will, however, determine the strength of the reference signal received through SAT 3 and report same as a QI-3 back to GW 1. The GW 1 notes that the UT 3 is receiving the pilot channel energy from GW 2, and will begin comparing the QI-3 to the QI-1 and QI-2. At some time QI-3 will indicate a better quality link through SAT 3 than, for example, the link made through SAT 1.

Referring now to FIG. 2B, at time T2 the GW 1 communicates with GW 2 through an inter-gateway communications link 4 to inform GW 2 of the presence of the UT 3. GW 1 and GW 2 then negotiate over the inter-gateway communications link 4 to allocate GW 2 resources for the UT 3. This generally involves an assignment to the UT 3 of at least forward and reverse frequency channels, data rate(s) and CDMA spreading codes. The GW 2 resource assignment information is then transmitted from GW 1 to the UT 3 using a predefined signalling protocol, such as one normally used when assigning the UT 3 to a new traffic channel of the GW 1. For the case where the UT 3 has a single satellite transmitter and receiver (transceiver) the frequency channel allocation from GW 2 will match the frequency channel allocation used by GW 1. Some time after the telephony link is established between the UT 3 and GW 2 through SAT 3 the GW 1 begins forwarding the call data (such as vocoded speech or data packets) through the inter-gateway link 4 to GW 2, and may then or later terminate the forward and reverse traffic links through SAT 1. GW 2 then begins to transmit the call data to the UT 3. At this time the UT 3 is operating in a multiple satellite diversity mode (e.g., SATs 1, 2 and 3 or SATs 2 and 3) and coherently combines the transmissions from these satellites. The UT 3 is further operating in a multiple gateway diversity mode (GW 1 and GW 2). The reverse link from the UT 3 is made through SAT 3 to GW 2 and then to GW 1 through the inter-gateway communication link 4.

Assuming that the links through SAT 1 have been terminated, the UT 3 continues to determine and transmit the quality information for SATs 2 and 3. This QI information is received by GW 1 and GW 2, and may be acted on only by GW 1. That is, GW 1 can control the forward link made through SAT 2, and will forward the QI information for SAT 3 back to GW 2 so that GW 2 can control the forward link made through SAT 3, or GW 2 can act upon what is received on the reverse link.

At some future time the UT 3 will begin receiving the reference channel signal from SAT 4. The quality information for the reference signal received through SAT 4 (QI-4) is then also relayed back to GW 1.

Referring now to FIG. 2C, at time T3 the UT 3 has transitioned from the GW 1 coverage area into the GW 2 coverage area. At a time when the quality information for SAT 4 becomes better than the quality information for SAT 2 the GW 1 also drops the link through SAT 2, after negotiating for additional gateway and satellite resources from GW 2, and setting up a second link through SAT 4 so that the UT 3 is operating in the multiple satellite diversity mode only with GW 2.

It is important to note that at this time the ongoing call is still connected from PSTN-1 to GW 1 and through the inter-gateway communication link 4 to GW 2 and then to the UT 3 via SAT 3 and SAT 4. During this time the GW 1 can retain overall control of the call, or call control can be shifted to GW 2 (e.g., examining and responding to the QI indicators, performing beam-to-beam and satellite-to-satellite handoffs, etc.) Control can also be maintained independently at each gateway.

When the call is terminated the UT 3 registers with GW 2 in a conventional fashion, the UT 3 home location register (HLR) and any visitor location registers (VLRs) are updated accordingly, and any future incoming or outgoing calls are made through the PSTN-2 that is coupled to GW 2.

FIGS. 2A–2C show the case where the single UT 3 is moving from the GW 1 CA to the GW 2 CA. However, it should be realized that at any given time a number of user terminals may be moving in the same manner, and a same or like number may be moving from the GW 2 CA to the GW 1 CA, or the user terminal can be stationary and the satellite may move from GW 1 to GW 2.

Figure 3:
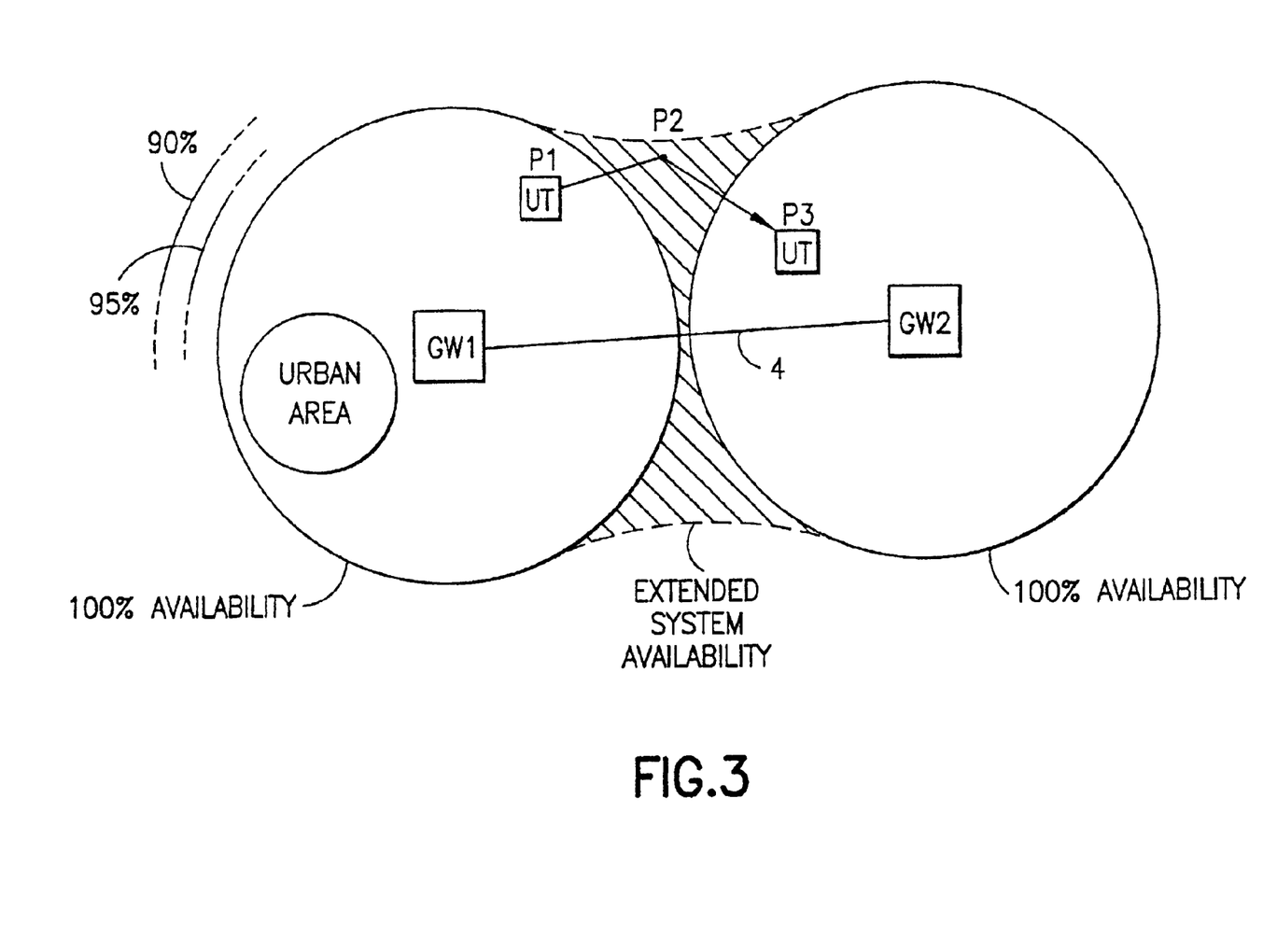
FIG. 3 is a diagram that is useful in explaining an increase in the effective gateway coverage area that is a feature of this invention.

FIG. 3 depicts an increase in the effective gateway coverage area that results form the intercoupling of the gateways as described above. Each system gateway can be considered to be surrounded by nominally concentric lines such as circles (or any other shape) that bound system availability regions. For example, when located within the inner circle (and not blocked by some RF shielding obstruction such as a tunnel) a user terminal is guaranteed that the satellite communication system is available 100% of the time. When located within the region between the inner circle and the next adjacent circle the system is available 95% of the time, etc. The extent of the availability regions are determined in part by the satellites that can be viewed from the gateway and the user terminal, in particular those satellites that lie within some predetermined range of elevation angles, such as above 10° from the horizon. While described below in the context of mobile UTs, it should be realized that these teachings apply as well to temporarily stationary UTs as well to fixed UTs.

In accordance with an aspect of this invention the effective gateway coverage region, in particular the effective system availability region, is extended since both gateways 1 and 2 can participate, each using one or more satellites that are in view of the particular gateway and the user terminal, and that may not be in view of the other gateway. For example, consider the user terminal 3 that begins a call at position one (P1), then moves to P2, and that then moves to P3 and terminates the call.

Under conventional practice the user terminal would exit the region of 100% system availability when moving to P2, and would exit completely the coverage area of GW 1 when moving to P3. However, in accordance with the technique of this invention the user terminal 3 instead at all times experiences improved system availability due to the extended effective gateway coverage area made possible by the multi-gateway diversity transmission and reception technique.

It is noted that the UT 3 could also remain stationary, either temporarily or permanently, at P2, and then switch to gateway 2, and possibly back again to gateway 1, as a function of satellite availability at the P2 location.

It should be further noted that the shapes of the coverage regions shown in FIG. 3 are exemplary and idealized, and in practice may have other shapes based on, for example, the local terrain and/or the latitude at which the gateways are located.

Figure 4:
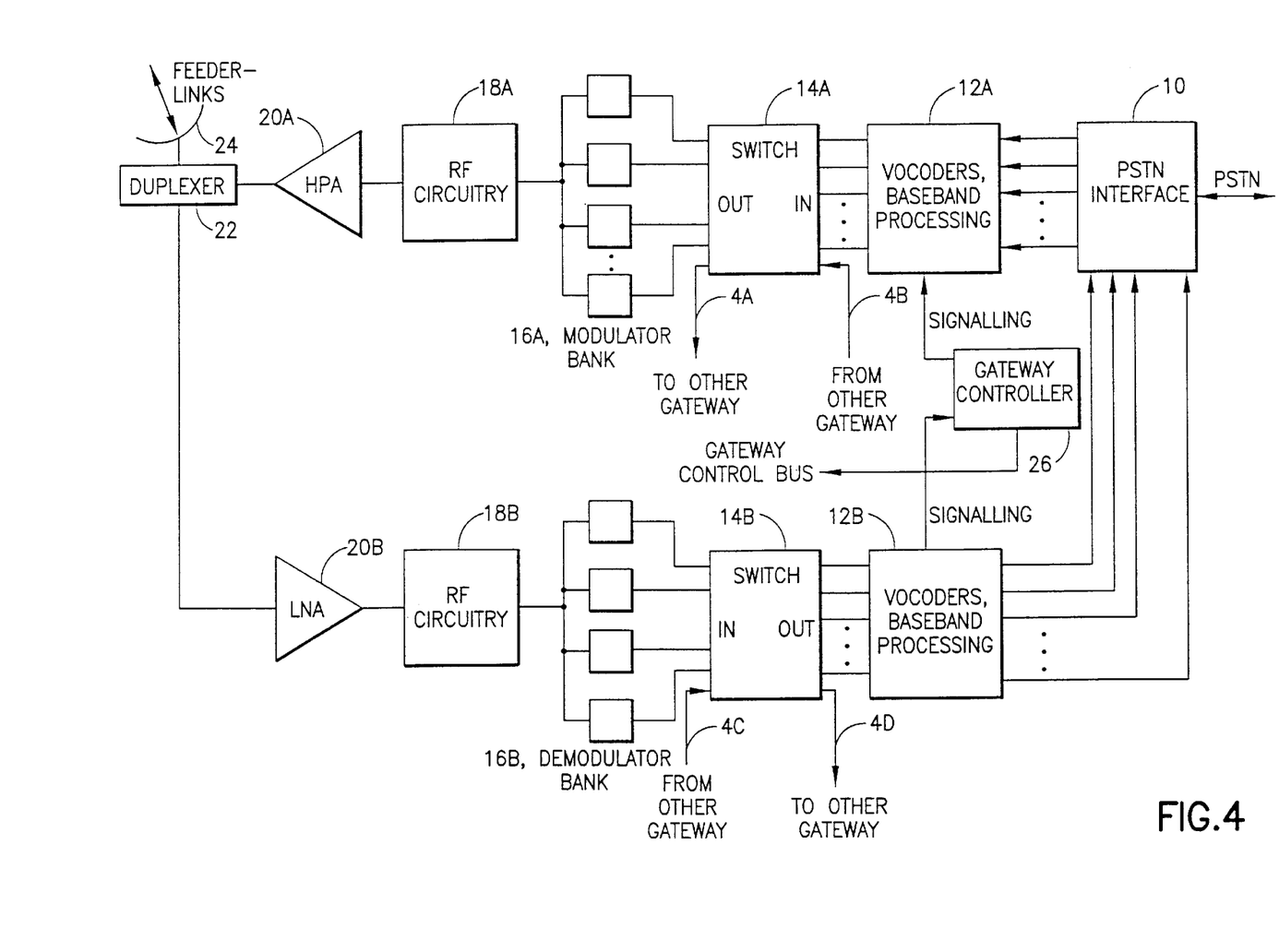
FIG. 4 is a simplified block diagram of one embodiment of a gateway showing the origin and termination of inter-gateway signal paths in accordance with an aspect of this invention.

FIG. 4 is a simplified block diagram of one embodiment of a gateway showing the origin and termination of the inter-gateway signal paths 4 in accordance with an aspect of this invention. The gateway, such as the GW 1 of FIG. 2, includes a terrestrial telecommunications network interface, such as a PSTN interface block 10 that is bidirectionally coupled to the analog or digital telephone trunk lines of the local PSTN (or to a private telephone network). The PSTN interface 10 has outputs connected to a baseband processing block 12A that includes a bank of voice coders (vocoders), and which in turn is connected to a switching block 14A. A given vocoder is used to compress a digital representation of a speech signal received from the PSTN, and is bypassed if a data signal is received from the PSTN (e.g., a facsimile signal or packetized data from an Internet server). Outputs of the switching block 14A are selectively coupled to a bank of signal modulators 16A where CDMA signal spreading is performed. The modulators 16A output modulated signals to an RF transmit circuitry block 18A where the signals are combined and upconverted to a transmission frequency before being applied to a high power amplifier (HPA) 20A. The output of the HPA 20A is applied through a duplexer 22 to the gateway directional antenna 24 and is transmitted as a feeder uplink (e.g., C-band or Ku-band) to one of the satellites that is in view of the gateway 1.

On the reception side a feeder downlink from the same satellite is applied through the duplexer 22 to a low noise amplifier (LNA) 20B and then to a receiver RF circuitry block 18B. The output of the RF circuitry block 18B is applied to a bank of demodulators 16B, including signal despreaders, and the individual despread signals are then applied through switching block 14B to a baseband processing block 12B that includes a bank of voice decoders (which are bypassed for data signals). The recovered speech signals from each of the user terminals serviced by the particular satellite presently pointed at by the directional antenna 24 are then applied to the PSTN interface 10 and connected to the appropriate telephone line, enabling full duplex voice or data calls to occur.

A gateway controller 26 operates to control the gateway circuitry, to set up signal paths using the switching blocks 12A and 12B, to bypass vocoders as required, and to control the generation and interpretation of signalling messages transmitted to and received from the user terminals. This control function includes interpreting the QI signals and controlling the forward link through the satellite accordingly.

In accordance with an embodiment of this invention, the inter-gateway link 4 originates and terminates at the switching blocks 14A and 14B. Referring first to switching block 14A, the baseband voice or data coming from the PSTN for the user terminal is routed to an output of the switching block 14A that is connected to the inter-gateway link 4 and is thus routed on line 4A to the second gateway. The data is received at the other gateway switching block 14A and is then applied to one of the modulators as if the input came from the gateway's own block of vocoders. In this manner the baseband voice or data information is treated in the other gateway as though it were received from the local PSTN (or private network), and is then applied to a selected one of the modulators in the modulator bank 16A. On the receive side the output from the switching block 14B, coming from one of the demodulators 16B, is routed to the inter-gateway link 4 on output line 4D, and demodulated signals from the other gateway are applied to the input to the switching block 14B through input line 4C. In this manner the baseband voice or data information is treated in the other gateway as though it were received from the antenna 24, and is selectively applied to one of the vocoders (for speech), and other baseband processing is performed as required before the signal is output to the local PSTN (or private network).

By example, and for the case shown in FIG. 2B, in GW 1 a PSTN speech input for the UT 3 is received, digitized and vocoded, and is then applied on line 4A to the GW 2, where it is received on input line 4B, applied to the input of the switching block 14A, and then used to modulate a carrier before being uplinked to SAT 3. A speech signal received from the UT 3 through SAT 3 is demodulated in GW 2 and applied through inter-gateway link line 4D to the GW 1, where it is received on line 4C, and applied to the PSTN via switching block 14B and the baseband processing and voice decoding block 12B.

It should be realized that the switching and inter-gateway link coupling arrangement shown in FIG. 4 is exemplary, and that other configurations could be used. For example, a separate switching block could be connected between the output of the modulator bank 16A and the input of the RF circuitry block 18A, and a corresponding switching block could be used between the output of the RF circuitry 18B and the inputs to the demodulator bank 16B, with the inter-gateway link 4 being connected at these points in a manner shown in FIG. 4. Diversity combining can be done in one of the gateways, or in both.

The inter-gateway communications link 4 can thus convey baseband (digital) call data between the gateways, or it can convey RF call data.

It was previously described in reference to FIGS. 2A–2C that the GW 1 was responsible for interpreting the QI indicators received from the UT 3, and then informing GW 2 of the result. It should be realized that the gateway controller 26 of GW 2 may examine the incoming QI indicators and respond to only those QI indicators that correspond to the SATs 3 and/or 4, while forwarding the QI indicators for SATS 1 and/or 2 over the inter-gateway link 4 to the GW 1 for processing.

As was described previously, one gateway (i.e., a Master GW) can be responsible for power controlling the UT 3, or each gateway may be responsible for the power control of any UT to which it is coupled, and may thus send power control bits as required to control the UT transmitter power. In this latter case, the UT 3, if receiving conflicting power control commands, can operate so as to minimize a possibility of creating interference for other user terminals, such as by selecting the power control command that results in the least transmitted power, or by making a power control adjustment only if commanded to do so by each gateway. Alternatively, one of the GWs (e.g., GW 1 in FIGS. 2A–2C) can serve as the UT power controller, and may thus receive UT signal strength measurements from the other gateway. In this case the single power-controlling gateway is responsible for generating power control commands that satisfy, if possible, the minimum link requirements for both serving gateways.

The teachings of the instant invention have been described thus far for the case of two gateways. However, and referring to FIG. 5, it should be realized that more than two gateways can be interconnected and operated as described above for providing an even larger effective coverage area. For example, GW 1 may be located in South America, GW 2 in North America, GW 3 in North Africa, and GW 4 in Northern Europe. In this case a given UT that is aboard an aircraft may originate a call at position P1, and terminate the call at position P2, all the while being connected to the PSTN-1 at GW 1. When transitioning from the coverage area of GW 3 to the coverage area of GW 4 the same procedure as described in FIGS. 2A–2C is performed by the GW 1 for negotiating the allocation of gateway and satellite resources for the UT. The inter-gateway links 4 may be made as shown for fully interconnecting the gateways, or each gateway may be connected only to its adjacent gateways (e.g., GW 1 connected only to GWs 2 and 3), with longer links being relayed through intervening gateways (e.g., GW 4 to GW 1 via GW 2 or GW 3). The inter-gateway links 4 need not be a separate communication path, but could form a part of the Ground Data Network (GDN) that interconnects all of the gateways to the Ground Operations Control Center (GOCC). Alternatively, the inter-gateway links 4 could be conveyed in whole or in part through the satellites of the communications constellation, or through some other satellite(s) altogether.

Figure 5:
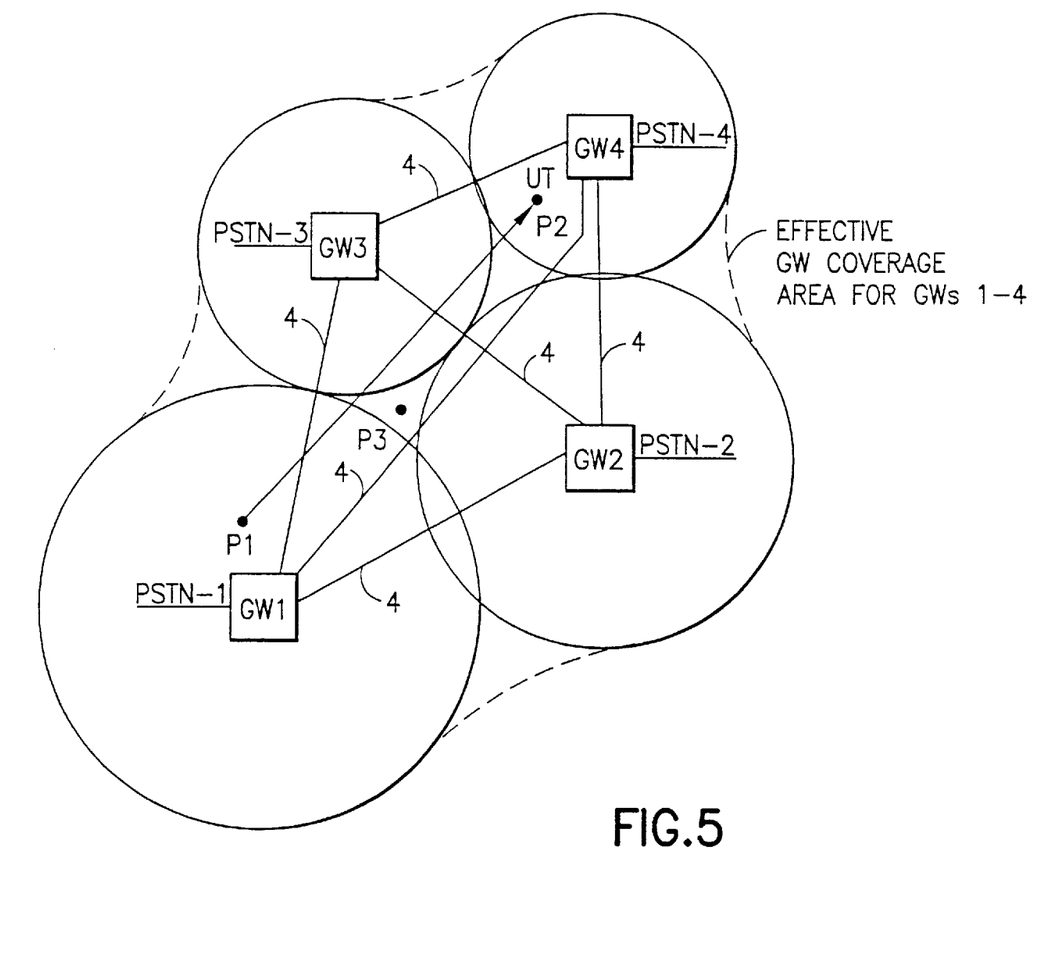
FIG. 5 depicts a case where more than two gateways are interconnected so as to have an increase effective coverage area.

It is also within the scope of this invention to simultaneously maintain a call through three or more gateways, such as GW 1, GW 2 and GW 3 for a UT located at position P3 in FIG. 5. As before, a single PSTN connection is maintained through one of the gateways (the primary gateway), and call information is exchanged over the inter-gateway communication links 4. In this case multiple lines 4A–4D (FIG. 4) are provided at the primary gateway for connecting to the other gateways or can be communicated through the satellite or other satellites.

It should be noted that the use of the inter-gateway communication links 4 and the multi-gateway diversity in accordance with this invention need not be applied in all cases. For example, the ability to transition between gateway coverage areas as described above may be a value-added feature that is either selected or not selected by a given user, either at the time the user's account and profile is established or on a call-by-call basis. For example, when about to transition out of a gateway's coverage area during a call the serving gateway may send a message to the UT that is displayed to the user, the message giving the user the option to take advantage of the ability to continue the call even after leaving the gateway's coverage area. By depressing a predetermined user terminal key during the call the appropriate signalling is sent back to the serving gateway for indicating the user's preference.

As was mentioned above, a gateway may use the multiple gateway diversity feature for user terminals that are stationary or fixed, or for those that are not transitioning between gateway coverage areas. By example, and referring again to FIG. 3, assume that the GW 1 is servicing the UT at position P1 near to the boundary with the GW 2 coverage area, and that an actual or predicted increase in user demand occurs for a region designated as an urban area, or assume that weather conditions or a disaster in the urban area result in more satellite power being required to service the user terminals located there. In this case the GW 1 may negotiate with GW 2 to use one or more less heavily loaded satellites that are visible to both GW 2 and the UT, thereby increasing capacity in the GW 1 service area. This arrangement may remain in effect for a portion of the on-going call, until the end of the ongoing call, or over several consecutive calls, depending on the needs of GW 1 and the ability of GW 2 to accommodate the additional load represented by the UT in the GW 1 coverage area.

A gateway may also use the multiple gateway diversity feature for UTs beyond the 100% coverage region for the gateway.

Figure 9:
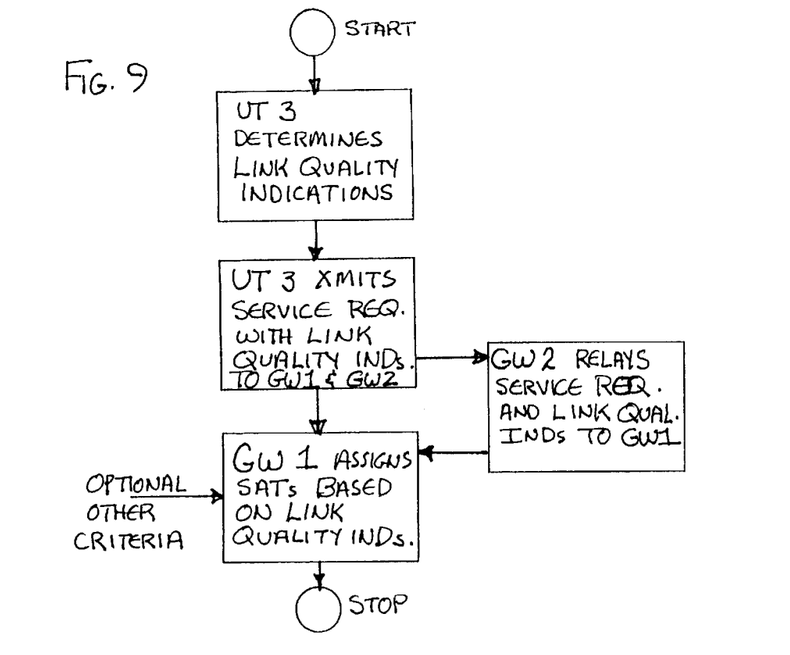
FIGS. 9, 10 and 11 are each a logic flow diagram of multi-gateway satellite allocation methods in accordance with this invention.

Referring to FIG. 9, in one multi-gateway embodiment of this invention the user terminal derives link quality information from the forward links made through a plurality of the satellites, such as a reference signal channel signal strength received through each satellite, and transmits link quality indications (QIs) back to both of the gateway 1 and the gateway 2, along with a service request or any other suitable message, through those satellites that are co-visible to the user terminal 3 and the gateways 1 and 2. Gateway 2 relays the service request and link quality indications back to the gateway 1 using the inter-gateway communications link 4. In response to the link quality indications received with the service request the gateway 1 assigns the user terminal to use one or more of the satellites, which may be one or more of SAT 1, SAT 2, SAT 3 and SAT 4. The assignment can be made based solely on the link quality indications criteria or, as in the previously described single gateway embodiments, may be made in combination with one or more other criteria, such as satellite elevation angle relative to the user terminal, satellite loading, satellite power consumption, satellite transmitted power flux density, time in view of the gateway, etc.

For the case where the user terminal 3 has transitioned completely into the service area of the second gateway, as in FIG. 2C, the gateway 1 can receive the link quality indications via the inter-gateway communications link 4, and then negotiate with the gateway 2 for satellite and system resources so as to load the user terminal onto one or more optionally positioned satellites (SAT 3 and/or SAT 4) that are co-visible to the user terminal 3 and the gateway 2.

It should be noted that in this case the user terminal will generally not be transmitting a service request to initiate a new call, as it can be assumed that the user terminal 3 will have registered with the gateway 2. However, this technique can be important when used during an existing call, that is being handled through gateway 1, for satellite handoffs and changes in satellite diversity levels.

Figure 10:
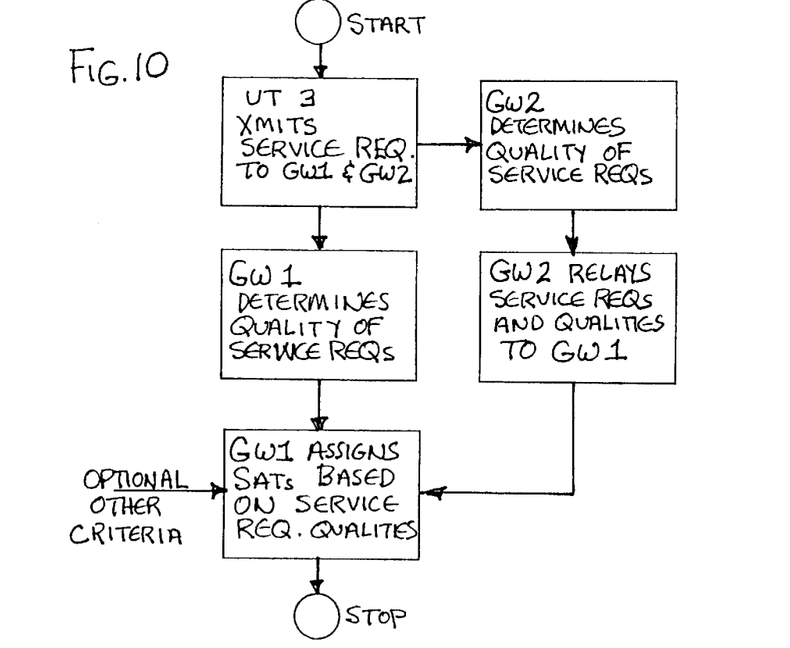

Referring to FIG. 10, in another multi-gateway embodiment of this invention the user terminal 3 transmits a service request or some other suitable message back to the gateway 1 and to the gateway 2 through a plurality of the satellites that are co-visible to the user terminal 3 and the gateways 1 and 2. The gateway 2 relays the service request back to the gateway 1 using the inter-gateway communications link 4, along with measured quality of the service request at each gateway 2 antenna 2A, 2B that receives the service request. In response to receiving the service request the gateway 1 also measures the quality of the received service request, such as received signal power, at each of the gateway antennas 1A, 1B. The gateway 1 then assigns the user terminal to use one or more of the satellites based on the determined quality of the service requests received at both gateways 1 and 2. The assignment can be made based solely on the determined quality of the service request criteria or, as in the previous embodiment, in combination with one or more other criteria, such as satellite elevation angle relative to the user terminal, satellite loading, satellite power consumption, satellite transmitted power flux density, etc.

Figure 11:
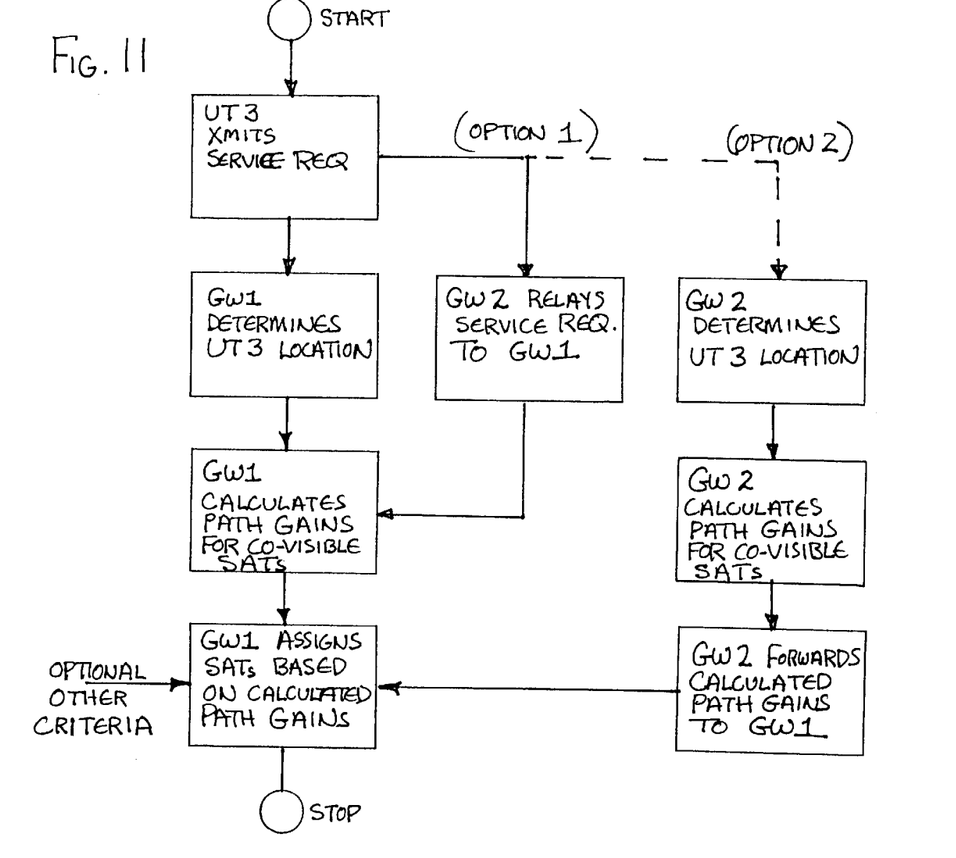

Referring to FIG. 11, in a further multi-gateway embodiment of this invention the user terminal 3 transmits a service request, or some other suitable message, back to the gateways 1 and 2 through a plurality of the satellites that are co-visible to the user terminal 3 and either one or both of the gateways 1 and 2. As a first option, the gateway 2 relays the service request back to the gateway 1 using the inter-gateway communications link 4. In response to receiving the service requests the gateway 1 performs a position location on the user terminal 3 (if not done previously) and then calculates the path gain of the user terminal through each of the satellites that relay the service request back to the gateways 1 and 2. The path gain can be determined in accordance with any one of the three techniques described previously. Alternatively, as a second option the gateway 2 also determine's location of the user terminal 3, if not already known, and then calculates the path gain(s) for those satellites through which it receives the service request (e.g., SATS 3 and/or 4). The gateway 2 then relays the calculated path gain(s) back to the gateway 1 over the inter-gateway communications link 4, along with the service request. The gateway 1 operates to assign the user terminal 3 to use one or more of the satellites based on the determined path gains, with the highest path gain satellite being selected first. The assignment can be made based solely on the determined path gains or, as in the previous embodiments, in combination with one or more other criteria, such as satellite elevation angle relative to the user terminal 3, satellite loading, satellite power consumption, satellite transmitted power flux density, etc. As before, the satellite assignments based on path gain can also be made in a predictive manner, by considering not only the current path gain through each of the satellites (based on the known satellite and user terminal locations), but future path gains as well.

The invention described in FIGS. 9, 10 and 11 has been presented in the context of two gateways. However, it should be realized that more than two gateways can be interconnected and operated as described above for providing an ability to allocate and assign satellites over an even larger geographical area to one or more user terminals 3.

It should thus be appreciated that while the invention has been particularly shown and described with respect to preferred embodiments thereof, changes in form and details may be made without departing from the scope and spirit of the invention.

What is claimed is:

1. A method for operating a satellite communication system, comprising steps of:

establishing a call connection between a terrestrial telecommunications network and a user terminal via a first gateway and at least one satellite; and while the call connection is established, selecting at least one further satellite, which may be the at least one satellite; and maintaining the call connection to the terrestrial telecommunications network via a second gateway, the least one further satellite, and the first gateway, the at least one further satellite being selected at least in part based on information transmitted from the second gateway to the first gateway through an inter-gateway communications link.

2. A method as in claim 1, wherein the step of maintaining includes a step of conveying call speech or data information between the first gateway and the second gateway through the inter-gateway communications link.

3. A method as in claim 1, wherein the step of maintaining includes steps of:

detecting at the first gateway that the user terminal is capable of communicating with the at least one further satellite that is in view of the second gateway and the user terminal;

negotiating with the second gateway for an assignment of resources to establish a connection with the user terminal; and bidirectionally coupling the terrestrial telecommunications network to the user terminal through the first gateway, through the second gateway, and through the at least one further satellite using the assigned resources.

4. A method as in claim 1, wherein the step of selecting includes steps of:

generating signal quality indications in the user terminal;

transmitting the signal quality indications back to the first gateway directly and via the second gateway; and selecting the at least one further satellite at the first gateway based at least in part on the signal quality indications.

5. A method as in claim 4, wherein the step of selecting further considers at least one of satellite elevation angle relative to the user terminal, satellite loading, satellite power consumption, and satellite transmitted power flux density.

6. A method as in claim 1, wherein the step of selecting includes steps of:

generating signal quality indications at the first gateway based on signals received from the user terminal at the first and second gateways; and selecting the at least one further satellite at the first gateway based at least in part on the signal quality indications.

7. A method as in claim 6, wherein the step of selecting further considers at least one of satellite elevation angle relative to the user terminal, satellite loading, satellite power consumption, and satellite transmitted power flux density.

8. A method as in claim 1, wherein the step of selecting includes steps of:

generating signal quality indications at the first gateway based on signals received from the user terminal at the first gateway;

generating signal quality indications at the second gateway based on signals received from the user terminal at the second gateway;

transmitting the generated signal quality indications back to the first gateway from second gateway; and selecting the at least one further satellite at the first gateway based at least in part on the signal quality indications.

9. A method as in claim 8, wherein the step of selecting further considers at least one of satellite elevation angle relative to the user terminal, satellite loading, satellite power consumption, and satellite transmitted power flux density.

10. A method as in claim 1, wherein the step of selecting includes steps of:

calculating at least one of current or future path gains at the first gateway based on signals received from the user terminal at the first and second gateways; and selecting the at least one further satellite at the first gateway based at least in part on the calculated path gains.

11. A method as in claim 10, wherein the step of selecting further considers at least one of satellite elevation angle relative to the user terminal, satellite loading, satellite power consumption, and satellite transmitted power flux density.

12. A method as in claim 1, wherein the step of selecting includes steps of:
  calculating at least one of current or future path gains at the first gateway based on signals received from the user terminal at the first gateway;
  calculating at least one of current or future path gains at the second gateway based on signals received from the user terminal at the second gateway;
  transmitting the calculated path gains back to the first gateway from second gateway; and
  selecting the at least one further satellite at the first gateway based at least in part on the calculated path gains.

13. A method as in claim 12, wherein the step of selecting further considers at least one of satellite elevation angle relative to the user terminal, satellite loading, satellite power consumption, and satellite transmitted power flux density.

14. A method for allocating communications traffic through a plurality of satellites of a constellation of non-geosynchronous orbit satellites, comprising the steps of:
  providing each of the plurality of satellites with a receiver for receiving communication links from a gateway, a transmitter for transmitting communication links to user terminals, a receiver for receiving communication links from user terminals, and a transmitter for transmitting communication links to the gateway;
  determining signal quality indications in a user terminal for signals received from the gateway through a plurality of the satellites;
  transmitting a message to the gateway that includes the determined signal quality indications;
  determining an identity of a satellite having a best signal quality indication associated therewith; and
  for a case where the satellite having a best signal quality indication can be assigned a new communication link, assigning a new communication link to the satellite.

15. A method as in claim 14, wherein the step of determining an identity further considers at least one of satellite elevation angle relative to the user terminal, satellite loading, satellite power consumption, time in view of the gateway, and satellite transmitted power flux density.

16. A method for allocating communications traffic through a plurality of satellites of a constellation of non-geosynchronous orbit satellites, comprising the steps of:
  providing each of the plurality of satellites with a receiver for receiving communication links from a gateway, a transmitter for transmitting communication links to user terminals, a receiver for receiving communication links from user terminals, and a transmitter for transmitting communication links to the gateway;
  transmitting a message to the gateway from the user terminal through a plurality of the satellites;
  determining message quality indications in the gateway for signals received through the plurality of the satellites;
  determining an identity of a satellite having a best message quality indication associated therewith; and
  for a case where the satellite having a best message quality indication can be assigned a new communication link, assigning a new communication link to the satellite.

17. A method as in claim 16, wherein the step of determining an identity further considers at least one of satellite elevation angle relative to the user terminal, satellite loading, satellite power consumption, and satellite transmitted power flux density.

18. A method for allocating communications traffic through a plurality of satellites of a constellation of non-geosynchronous orbit satellites, comprising the steps of:
  providing each of the plurality of satellites with a receiver for receiving communication links from a gateway, a transmitter for transmitting communication links to user terminals, a receiver for receiving communication links from user terminals, and a transmitter for transmitting communication links to the gateway;
  transmitting a message to the gateway from the user terminal through a plurality of the satellites;
  determining, in the gateway, path gains for signal paths through the plurality of the satellites;
  determining an identity of a satellite having a best current or predicted path gain associated therewith; and
  for a case where the satellite having the best path gain can be assigned a new communication link, assigning a new communication link to the satellite.

19. A method as in claim 18, wherein the step of determining an identity further considers at least one of satellite elevation angle relative to the user terminal, satellite loading, satellite power consumption, and satellite transmitted power flux density.

20. A satellite communication system comprising a plurality of terrestrial gateways, at least one user terminal, and a plurality of satellites, said system further comprising:
  circuitry in a first gateway for bidirectionally coupling said first gateway to a first terrestrial telecommunications network and circuitry for bidirectionally coupling said at least one user terminal to said first terrestrial telecommunications network through at least one satellite;
  an inter-gateway communications link bidirectionally coupled between said first gateway and a second gateway; and
  further circuitry in said first gateway, coupled to said inter-gateway communications link, for coupling said at least one user terminal to said first terrestrial telecommunications network via said second gateway and at least one further satellite, said first gateway further comprising means for selecting a satellite for establishing a new communication link or handing off an existing communication link based on information received from the user terminal at the first gateway and based on information received from the second gateway via the inter-gateway communications link.

* * * * *